United States Patent [19]

Denker et al.

[11] Patent Number: 5,186,313

[45] Date of Patent: Feb. 16, 1993

[54] CONVEYOR BELT TRACKING AND DRIVE MECHANISM

[75] Inventors: Stanley D. Denker; Bradley H. Lehrke, both of New Richmond, Wis.

[73] Assignee: Doboy Packaging Machinery, Inc., New Richmond, Wis.

[21] Appl. No.: 878,962

[22] Filed: May 6, 1992

[51] Int. Cl.⁵ .............................. B65G 39/16
[52] U.S. Cl. .................... 198/806; 198/835; 198/840
[58] Field of Search ............... 198/806, 807, 835, 840

[56] References Cited

U.S. PATENT DOCUMENTS

| | | |
|---|---|---|
| 372,157 | 10/1887 | Lawton . |
| 808,122 | 12/1905 | Tanck . |
| 994,910 | 6/1911 | Duesterhoff . |
| 2,304,843 | 12/1942 | Nordquist ............... 198/807 |
| 2,410,611 | 11/1946 | Pratt et al. ............... 198/840 |
| 2,628,707 | 2/1953 | Shacikoski . |
| 2,725,757 | 12/1955 | Murphy ................... 198/806 |
| 3,118,314 | 1/1964 | Schuster . |
| 3,540,571 | 11/1970 | Morse et al. ............. 198/806 |
| 3,687,273 | 8/1972 | Macone et al. .......... 198/806 |
| 3,702,131 | 11/1972 | Stokes et al. ............ 198/806 |
| 4,174,171 | 11/1979 | Hamaker et al. ........ 198/806 |
| 4,557,372 | 12/1985 | Rajagopal . |
| 4,572,417 | 2/1986 | Joseph et al. . |
| 4,629,062 | 12/1986 | Silverthorn et al. ..... 198/840 |
| 4,803,804 | 2/1989 | Bryant . |
| 5,022,514 | 6/1991 | Lofberg . |

Primary Examiner—Joseph E. Valenza
Attorney, Agent, or Firm—Haugen and Nikolai

[57] ABSTRACT

A conveyor belt tracking and drive mechanism for use with a short, wide conveyor belt system. The mechanism has a stationary frame with first and second roller journaled for rotation at a first and second end of the stationary frame. A first moveable frame is pivotally suspended from the stationary frame. A second moveable frame is pivotally suspended from the first moveable frame. The second moveable frame has a drive roller and motor operatively connected to the drive roller. A micro-tracking adjustment screw, disposed between the first moveable frame and stationary frame, is used to adjust the tracking of the conveyor belt by laterally moving the first and second moveable frame. A belt adjustment screw located between the first moveable frame and second moveable frame allows one as to adjust the tension of the short, wide conveyor belt by movement of the power roller against or away from the short, wide conveyor belt.

21 Claims, 4 Drawing Sheets

CONVEYOR BELT TRACKING AND DRIVE MECHANISM

BACKGROUND OF THE INVENTION

Field of the Invention

The present invention relates to a conveyor, more particularly to an apparatus for adjusting conveyor belt tracking and tension with the drive mechanism.

Discussion of the Prior Art

Conveyor belts have a tendency during operation to move sideways on the rollers which support them. This is especially pronounced in the case of short, wide belts but present in all belts, short or long, wide or narrow. This cross-tracking can cause uneven wear and excess tension on the belt. Additionally, the belt can rub against supporting structure and become damaged. Furthermore, items carried on the crosstracking conveyor belt may not follow a desired path. This, of course, is disruptive if the conveyor is feeding products into a wrapping machine or the like where the items must line up properly at the end of the conveyor belt path.

There have been various methods related to sensing and adjusting the tracking of conveyor systems particularly in reprographic apparatus. These methods often have servo control arrangements such as in U.S. Pat. No. 4,572,417 to Joseph et al., and U.S. Pat. No. 4,557,372 to Rajagopal. Adjusting of belt tracking is generally limited to adjusting the drive roller or a special tracking roller. The tracking roller is often located on the exterior of the belt path along with an additional drive or take-up roller. It is also common to reverse bend the belt around a second drive roller to increase belt tension. The additional roller reverse bending increases the tension and wear on the belt. This exterior position and reverse bending makes changing belts difficult and may require the use of tools to remove the belt.

Therefore, what is needed is a conveyor belt tracking and drive mechanism for conveyor belt systems which has the drive and tracking mechanism all in one unit.

It is the object of the present invention to provide a conveyor belt tracking and drive mechanism for belt conveyor systems which uses the main drive as the tracking element.

It is another object of the invention to provide a self contained belt tension control on the interior of the belt path.

Yet another object of the invention is to allow highly precise manual adjustment of the belt tracking Still another object of the invention is to provide a conveyor belt tracking and drive mechanism which allows easy removal and replacement of the conveyor belt.

Another object is to increase belt life by having minimal necessary tension to drive the belt.

Yet another object of the invention is to provide for self adjusting of the belt tension due to the load conveyed Still another object of the invention is to provide proper tension adjustment of a light duty belt so it can handle a heavy load without breaking.

SUMMARY OF THE INVENTION

The present invention is a conveyor belt tracking and drive mechanism for use on a conveyor system. The conveyor system has a main stationary frame containing a pair of crowned nose rollers journaled for rotation thereon along parallel axles to define a horizontal flight. The drive roller and its drive motor are mounted on a pendulous sub-frame suspended from a further frame which is pivoted to the stationary frame. A micro-adjusting tracking screw is operatively disposed between the main frame and the further frame for alignment purposes.

The tracking of the conveyor belt relative to the rollers about which it is entrained is adjusted by turning a micro-tracking adjustment screw. This causes the pendulous subframe and the further frame to move laterally about the pivot point of the stationary frame in order to correct any tendency of the belt to wander or cross-track.

The belt tension is adjusted by manipulating the belt adjustment screw which pivots the pendulous subframe towards or away from the further frame. Clockwise rotation raises the subframe and loosens the belt tension by effectively lifting the motor and drive roller away from the inner side of the belt, allowing removal of the belt. Counterclockwise rotation increases the belt tension by lowering the motor and drive roller against the inner surface of the belt. Additionally, the belt tension will self adjust because of the nature of the pendulous subframe. The tension can also change if the belt rotation is changed. Clockwise rotation of the belt decreases belt tension counterclockwise rotation of the belt increases belt tension.

BRIEF DESCRIPTION OF THE DRAWINGS

These and other objects of the invention will become more readily apparent from the following detailed description taken in conjunction with the accompanying drawings in which.

DETAILED DESCRIPTION OF THE PREFERRED EMBODIMENT

The present invention relates to a belt tracking and drive mechanism for any conveyor system utilizing short or long and wide or narrow belts. The mechanism has three main portions, the stationary main frame designated generally 5, a horizontal plate 10 pivotally suspended from the main frame 5 about a vertical axis, and a subframe 15 pendulously suspended from the horizontal plate 10 about a horizontal axis.

Figure 1:
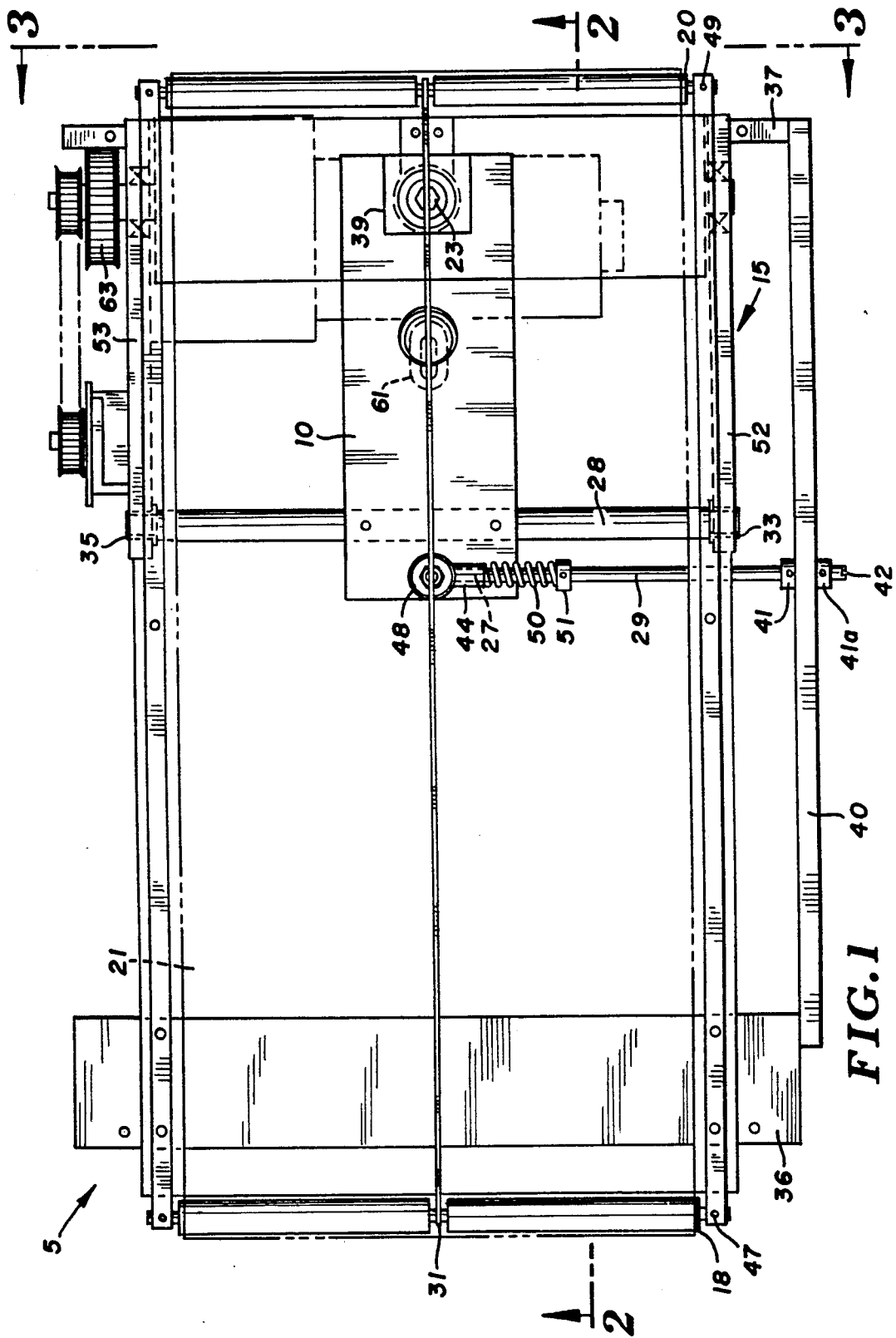
FIG. 1 is a top view of the invention as utilized by a belt conveyor system.
Figure 2:
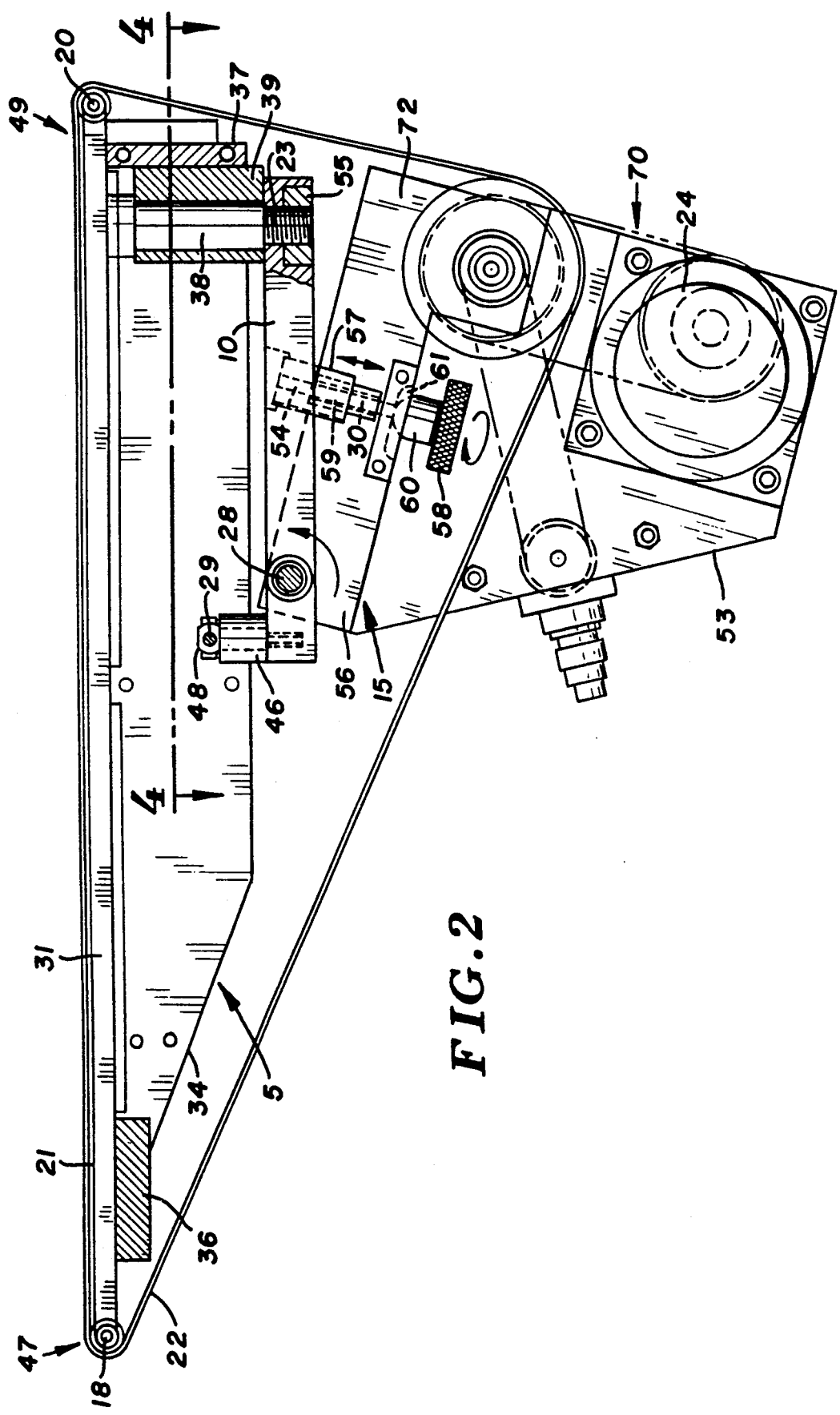
FIG. 2 is a view taken along line 2—2 of FIG. 1.

The main frame as shown in FIGS. 1 and 2 contains two crowned nose rollers 18 and 20 at opposite ends of a flat surface 21 over which a horizontal flight of endless belt 22 will travel. The horizontal plate 10 is connected to the main frame 5 by shoulder screw 23 threaded into plate 10 at 38 and micro adjustment tracking screw 29 which is utilized in adjusting the tracking of the belt. The subframe 15 contains the motor and motor housing 24 and the drive roller 26. The subframe 15 is coupled to the horizontal plate 10 by a pivot bar 28 and belt adjustment screw 30. The geometry of roller placement is such that the belt 22 runs in a triangular path around the crowned nose rollers 18 and 20 and the drive roller 26 to allow a minimal necessary tension on belt 22 to drive it (as shown by FIG. 1). The geometry eliminates the need to reverse bend the belt about a tensioner roller. This arrangement of the three rollers and pendulous subframe 15 also acts as a self tensioner while the belt 22 is running and external force is applied to the conveyor. This will be explained in further detail in the operation of the invention.

The main frame 5 has a flat upper surface 21, two side flanges 32 and 34 connected to opposed ends of a first cross member 36 and a second cross member 37. Center support bar 31 prevents buckling of the crowned nose rollers. A bearing block 39 is bolted or otherwise affixed to the second cross member 37.

The micro adjustment tracking screw 29 extends through a bore (not shown) in side plate 40. It contains a threaded end 27 and head 31 for manipulation with a screw driver or other tool. The screw 29 can freely rotate within the bore 43 while being captured on either side of side plate 40 at collars 41 and 41a. The crowned nose rollers 18 and 20 located at the first end and second end of surface 21 are journaled for rotation in the flanges 32 and 34. The main frame is adopted to be mounted to a base structure (not shown) to elevate it to a desired height relative to the floor.

Bolted via spacer 46 or otherwise attached to the upper surface of horizontal plate 10 is a rod 44 which receives the threaded end 27 of micro-adjustment tracking screw 29. Rod end 48 allows rod 44 to have slight lateral and vertical play.

The horizontal plate 10 contains a bore (not shown) for receiving bar 28 which is bolted to the horizontal plate. Bar 28 is journaled for rotation in the flanges 32 and 34 by way of bearings 33 and 37. Set in the horizontal plate is a second block 54 which has a bore for the belt adjustment screw 30. Plate 10 also contains a counterbore recess for locknut 55

Figure 3:
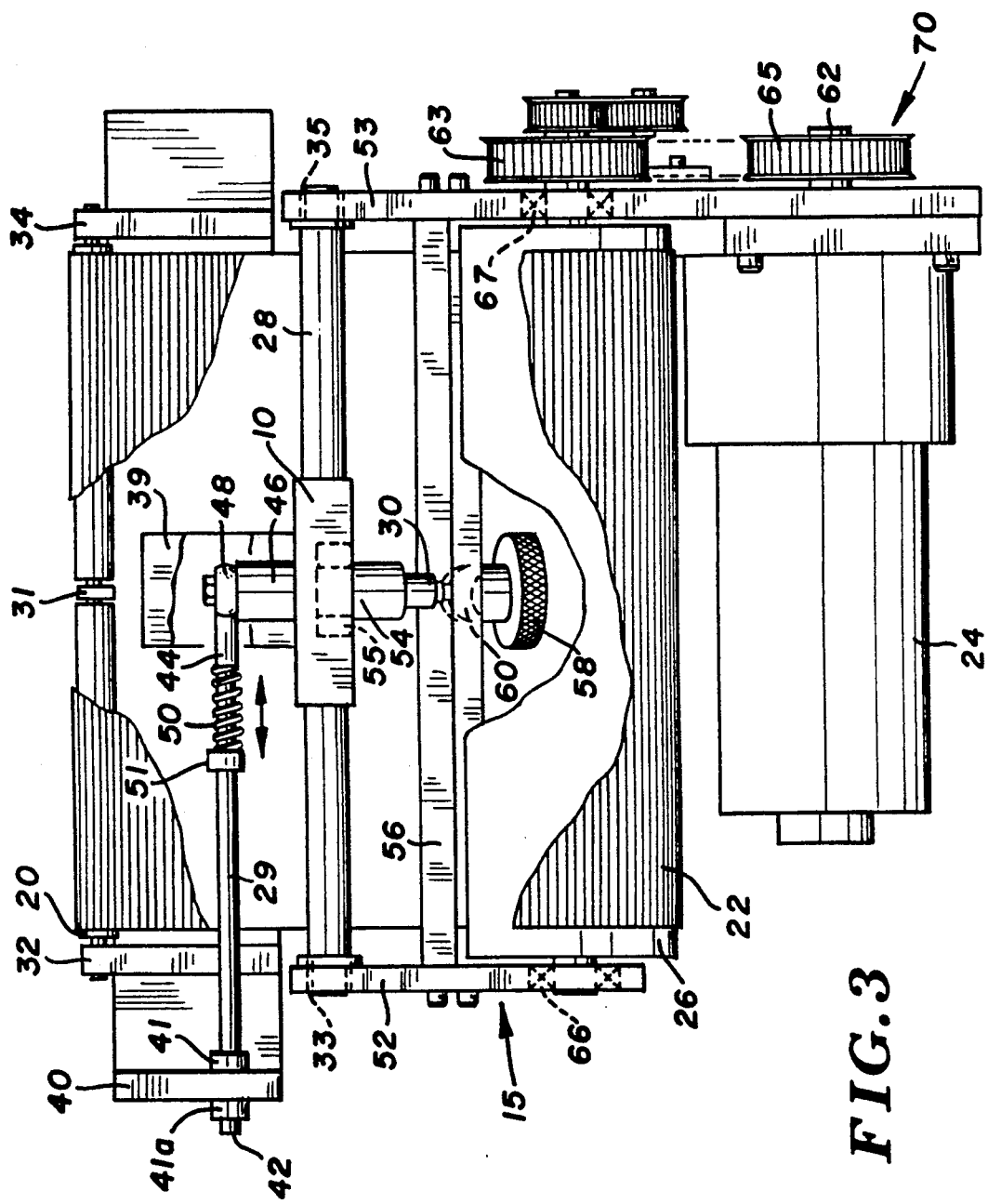
FIG. 3 is a end view taken along line 3—3 in FIG. 1 of the invention as utilized by a belt conveyor system, the view being partially cut away to show the internal frame structure.

The subframe 15 has a two side member 52 and 53 and a central member 56, as shown in FIGS. 2 and 3. The subframe 15 is suspended by two pivot points located at bearings 33 and 35 on the opposing ends of pivot bar 28. The central member 56 contains a threaded bore 57 which receives the belt tension adjustment screw 30. The belt tension adjustment screw 30 has a handle or knob 58 for manual manipulation of the screw and a threaded end 59. The handle 58 has a spherical portion 60 and is located in an elliptical recess 61. The drive assembly 70 is located on the lower portion of the side member 53.

The motor is enclosed in housing 24 with drive shaft 62 extending from the housing 24. A V-belt (not shown) is entrained about the motor pulley 65 and the drum pully 63 on the end of the power roller 26 to drive the power roller 26. Power roller 26 is journaled for rotation in side members 52 and 53 with bearings 66 and 67 and cooperates with the inner surface of conveyor belt 22.

In operation, the subframe must first be raised to allow workers to slide conveyor belt 22 over the drive roller 26 and the crowned nose rollers 18 and 20. To do this, the belt tension adjustment screw 30 is rotated clockwise. This action will pivot the subframe 15 about pivot bar 28, moving spherical portion 60 along the elliptical recess 61 and bringing end 72 up towards plate 10. Belt 22 is then placed around the two crowned nose rollers 18 and 20 and the drive roller 26. The adjustment screw 30 is rotated counterclockwise lowering subframe end 72 away from plate 10 creating tension in belt 22 by loading the weight of the power roller 26, the drive motor in housing 24 and the frame 15 against belt 22.

The counterclockwise rotation of the drive roller 26 will further increase the tension in the belt because the drive roller 26 tries to climb belt 22. It should also be noted that the tension is also increased when the belt is running in a counterclockwise direction and an external force is applied to the conveyor, such as the force from objects carried by the conveyor. Subframe end 72 will rotate further away from plate 10 to create more tension in belt 22. The opposite occurs when the belt is driven clockwise. The subframe end 72 rotates towards plate 10 when an external force is applied to the conveyor. Also the drive roller 26 acts to pull on belt 22 instead of trying to climb it, this action will cause slippage of an overloaded light weight belt instead of breakage.

Figure 4:
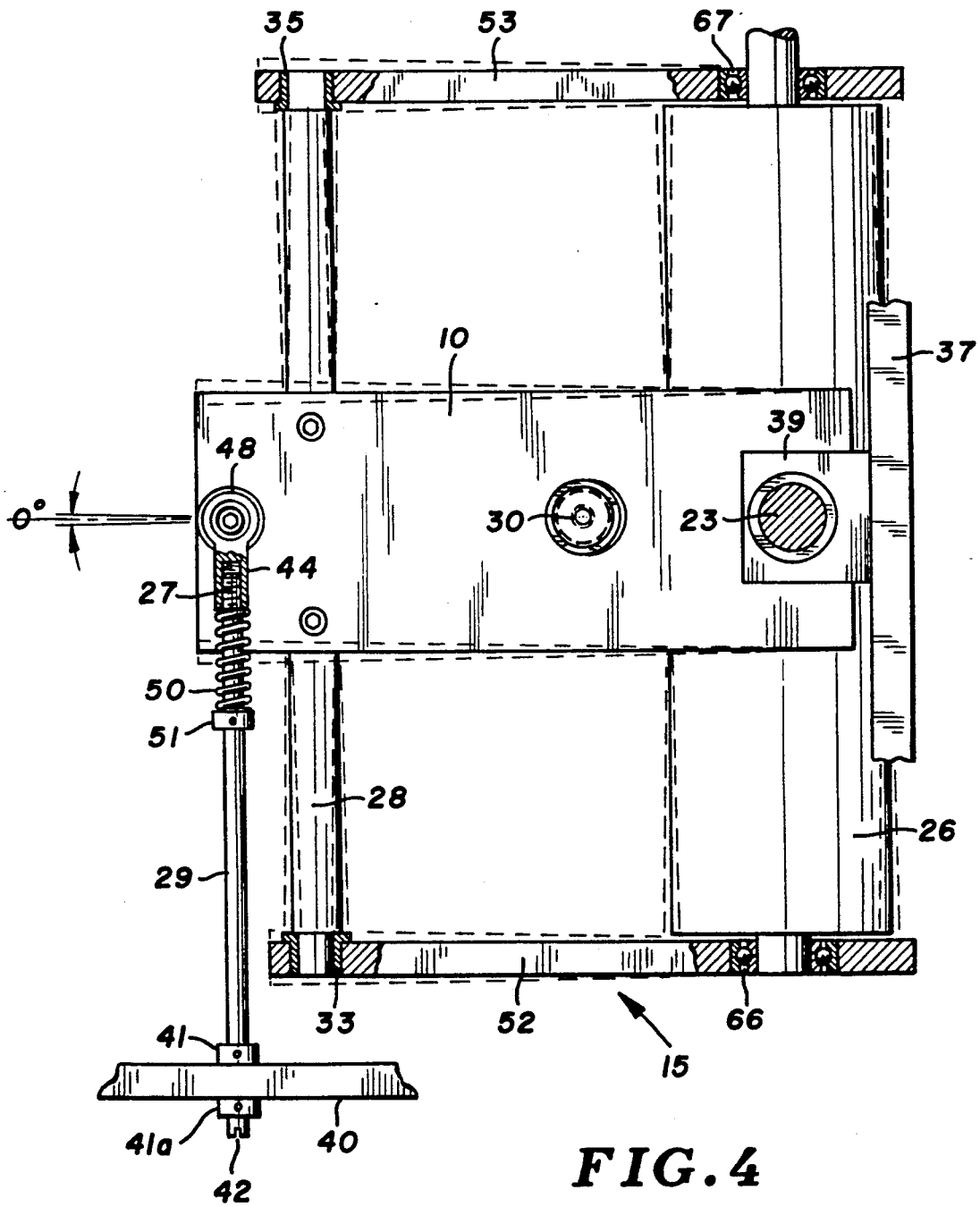
FIG. 4 is a view taken along line 4—4 of FIG. 2.

The triangular configuration lowers cost by eliminating the need for reverse bending of the belt with another tensioner roller. It also is more sanitary because, unlike in reverse bending arrangements, the exterior surface of the belt will not run over the second drive. When the appropriate tension is in belt 22, taking into account that the belt tension will self adjust further, the conveyor is ready to operate. During the initial operation, belt 22 may tend to cross-track or wander laterally over the rollers, potentially damaging the belt and disrupting the conveyor operation. The micro-adjustment tracking screw 29 is then used to counter this tendency. A screw driver or other appropriate tool is placed in or on head 42 for rotating the tracking screw 29 in the desired direction. As the tracking screw 29 is rotated, its threads advance into or recede from bore 46, causing plate 10 to be rotated about shoulder screw 23 Since the entire drive assembly including drive roller 26 is suspended by plate 10, it is also rotated changing the relative alignment between the nose rollers and the drive roller. FIG. 4 shows the rotation of the drive assembly in broken line. Thus, the power roller 26 is rotated with the drive assembly and, the tracking of belt 22 is adjusted until it runs centered between the flanges 32 and 34. As noted before any backlash in tracking screw 29 is removed by compression spring 50.

With reference to FIG. 2, if the conveyor belt 22 is being driven so as to carry products from right to left, when the belt is loaded by the weight of the product on it, the pivot arm 56 supporting the motor and drive roller assembly tends to swing clockwise (when viewed in FIG. 2), thereby further increasing the tensioning of the belt and overcoming any tendency for the belt to slip. If the conveyor belt 22 is being driven so as to carry products from left to right, when the belt is loaded by the weight of the product on it, the pivot arm 56 supporting the motor and drive roller assembly tends to swing counterclockwise (when viewed in FIG. 2), thereby decreasing the tensioning of the belt and allowing light weight belts to carry heavier loads.

It is understood that the above disclosure of the presently preferred embodiment is to be taken as illustrate of the invention. Furthermore, it is to be understood that those skilled in the art capable of making modifications without departing from the true spirit and scope of the invention.

What is claimed is:

1. A conveyor belt tracking and drive mechanism for use with a conveyor belt system, said tracking and drive mechanism comprising:

(a) a stationary frame having a first and second roller journaled for rotation on said stationary frame to define a generally horizontal conveyor flight;

(b) a moveable frame suspended from said stationary frame, said moveable frame having a drive roller journaled for rotation therein and operatively connected to a source of rotational power;

(c) a tracking adjustment means, connected between said moveable frame and said stationary frame, for providing lateral movement of said moveable frame;

(d) a further adjustment means, operatively coupled between said moveable frame and said stationary frame, for providing vertical movement of said moveable frame; and (e) an endless conveyor belt entrained about said first and second rollers and said drive roller, with said adjustment means affecting the tension of said conveyor belt.

2. The mechanism of claim 1 wherein said moveable frame comprises:

(a) a first moveable frame member, said first moveable frame member being suspended from said stationary frame; and (b) a second moveable frame member, said second moveable frame member pendulously suspended from said first moveable frame member and having said drive roller journaled for rotation on said second moveable frame member and operatively connected to said source of rotational power.

3. The mechanism of claim 2 wherein said tracking adjustment means is coupled between said first moveable frame member and said stationary frame for providing limited lateral movement of said first and second moveable frame members relative to said stationary frame.

4. The mechanism of claim 3 wherein said further adjustment means is connected between said first moveable frame member and said second moveable frame member for providing vertical movement of said second moveable frame member relative to said first moveable frame member.

5. The mechanism of claim 4 wherein when said second moveable frame member is moved towards said first moveable frame member, the tension of said belt is decreased by removing the weight of said drive roller and said second moveable frame member and when said second moveable frame member is moved away from said first moveable frame member, the tension of said belt is increased by loading said belt with the weight of said drive roller and second moveable frame member.

6. The mechanism of claim 5 wherein said tension of said belt is further increased by loading said belt with the weight of objects to be conveyed.

7. The mechanism of claim 4 further including a pivot bar affixed to said first moveable frame member and said second moveable frame member being journaled for rotation on said pivot bar.

8. The mechanism of claim 2 further including a pivot pin affixed to said first moveable frame member, said pivot pin journaled for rotation within said stationary frame.

9. The mechanism of claim 3 wherein said tracking adjustment means comprises a micro-tracking adjustment screw having a first end rotatably within said first moveable frame and a second end threaded in said stationary frame.

10. The mechanism of claim 4 wherein said further adjustment means comprises a belt tension adjustment screw having one end thereof threadably engaged within said first moveable frame member and another end having a knob for manual manipulation and an intermediate portion threaded through said second moveable frame member.

11. The mechanism as in claim 2 wherein said first movable frame member is pivotally coupled to said stationary frame for limited rotation about a generally vertical axis.

12. The mechanism as in claim 10 wherein said tracking adjustment means comprises a manually operable screw member operatively coupled between said stationary frame and said first moveable frame member at a location offset from the pivot coupling said first moveable frame member to said stationary frame.

13. A conveyor belt tracking and drive mechanism for use with a conveyor belt system, said tracking and drive mechanism comprising:

(a) a stationary frame having a first and second roller journaled for rotation about parallel, spaced-apart axles on said stationary frame to define a generally horizontal conveyor flight therebetween;

(b) a first moveable frame, said first moveable frame suspended from said stationary frame by a pivot allowing limited rotation of said first movable frame in a generally horizontal plane;

(c) a second moveable frame, said second moveable frame pendulously suspended from said first moveable frame and having a drive roller journaled for rotation therein, said drive roller being operatively connected to a power source;

(d) belt tracking adjustment means, connected between said first moveable frame and said stationary frame, for providing lateral movement of said first and second moveable frame about said pivot;

(e) a further adjustment means, connected between said first moveable frame and said second moveable frame, for providing vertical movement of said second moveable frame relative to said first moveable frame with said further adjustment means affecting the tension of said belt; and (f) an endless conveyor belt entrained about said first and second rollers and said drive roller with said further adjustment means affecting the tension of said belt.

14. The mechanism of claim 11 and further including a pivot bar affixed to said first moveable frame member, said second moveable frame member being journaled for rotation on said pivot bar.

15. The mechanism of claim 11 wherein said belt tracking adjustment means comprises a micro-tracking adjustment screw having a first end freely rotatable within said first moveable frame and a second end threaded in said stationary frame.

16. The mechanism as in claim 11 wherein said first movable frame member is pivotally coupled to said stationary frame for limited rotation about a generally vertical axis.

17. The mechanism of claim 11 wherein said second moveable frame member is moved towards said first moveable frame member, tension of said belt is decreased by removing the weight of said drive roller and said second moveable frame member and when said second moveable frame member is moved away from said first moveable frame member, the tension of said belt is increased by loading said belt with the weight of said drive roller and second moveable frame member.

18. A conveyor belt tracking and drive mechanism for use with a conveyor belt system, said tracking and drive mechanism comprising:
   (a) a stationary frame having a first and second crown nose roller journaled for rotation at a first and second end of said stationary frame;
   (b) a first movable frame pivotally suspended from said stationary frame;
   (c) a second movable frame pivotally suspended from said stationary frame, said second frame having a drive roller and a motor operatively connected to said drive roller;
   (d) a micro-tracking adjustment screw having a first end rotatably within said first moveable frame and a second end threaded through said stationary frame, said micro-tracking adjustment screw providing lateral movement of said first and second moveable frames;
   (e) a belt adjustment screw having one end thereof threadably engaged within said first moveable frame member and another end having a knob for manual manipulation and an intermediate portion threaded through said second moveable frame member; said belt adjustment screw providing vertical movement of said second moveable frame relative to said first moveable frame; and
   (f) an endless conveyor belt entrained about such first and second crown nose rollers and said power roller.

19. The mechanism of claim 16 further comprising said first moveable frame affixed to a pivot bar journaled for rotation within said second moveable frame.

20. The mechanism of claim 16 further comprising said first moveable frame affixed to a pivot pin journaled for rotation within said stationary frame.

21. The mechanism of claim 16 wherein said belt adjustment screw effects the tension of said belt when said second moveable frame member is moved towards said first moveable frame member, the tension of said belt is decrease by removing the weight of said drive roller and said second moveable frame member and when said second moveable frame member is moved away from said first moveable frame member, the tension of said belt is increased by loading the weight of said drive roller and second moveable frame member on said belt.

* * * * *